April 18, 1961 O. HARKE 2,980,130
MIXING VALVE
Filed Oct. 6, 1958 3 Sheets-Sheet 2
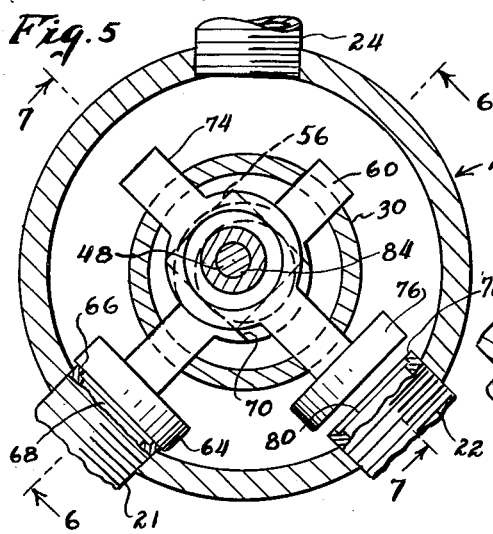
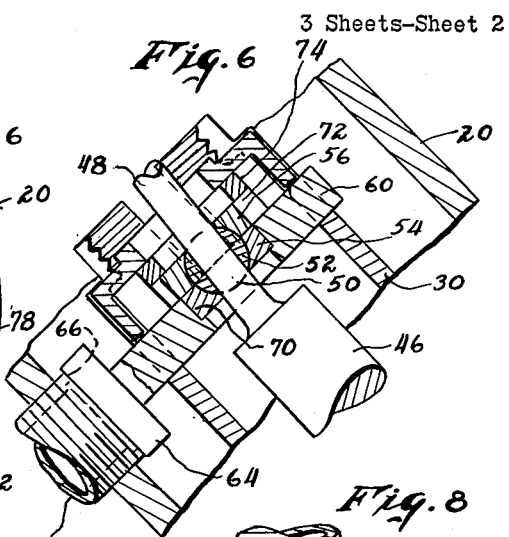
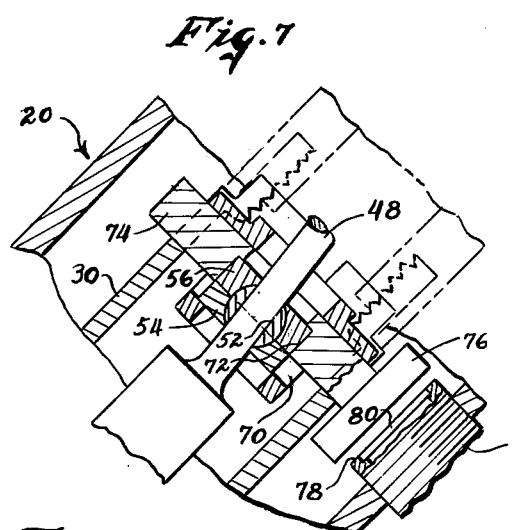
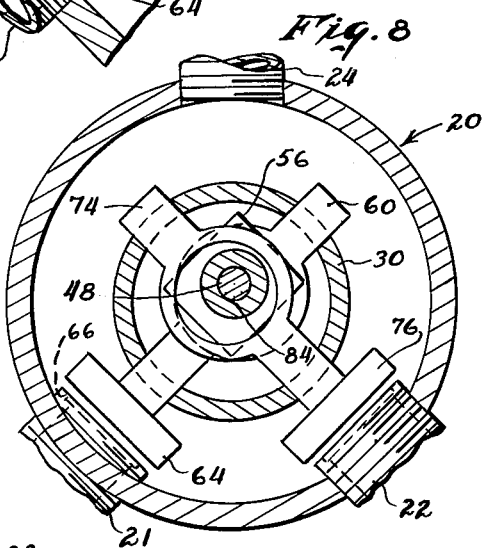
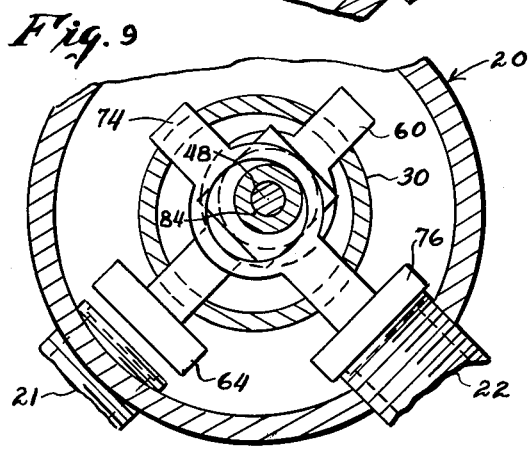
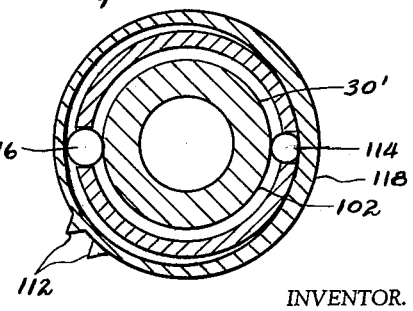
INVENTOR.
Otto Harke
BY Emery, Whittemore
Sandoe & Dix
ATTORNEYS

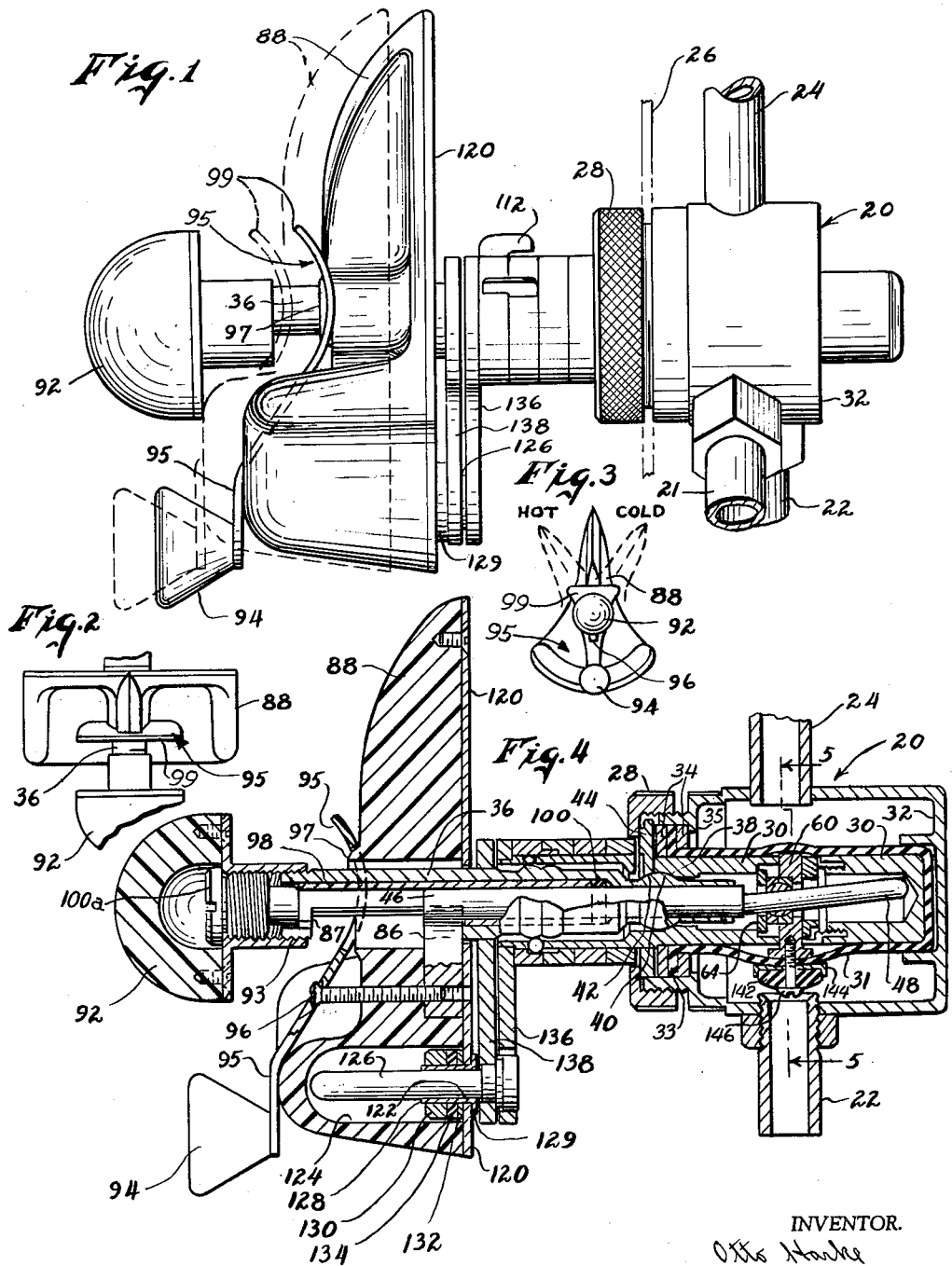

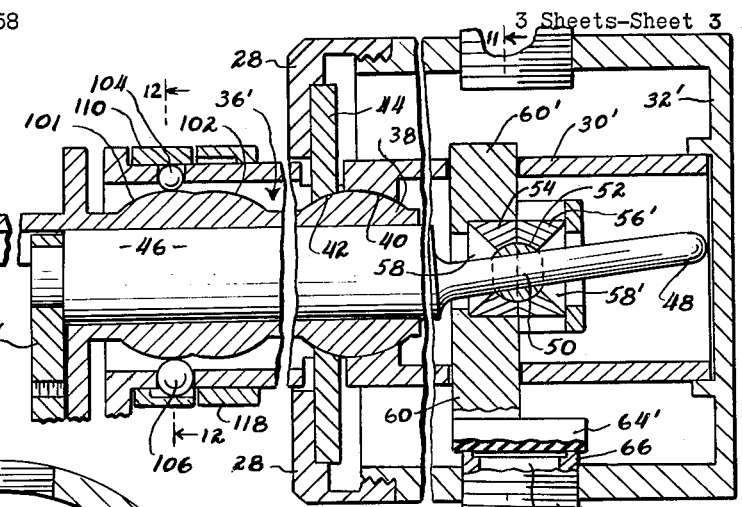
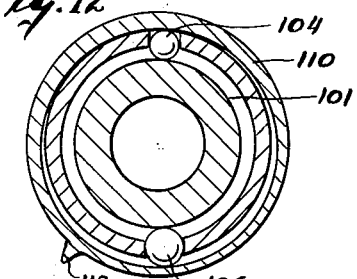
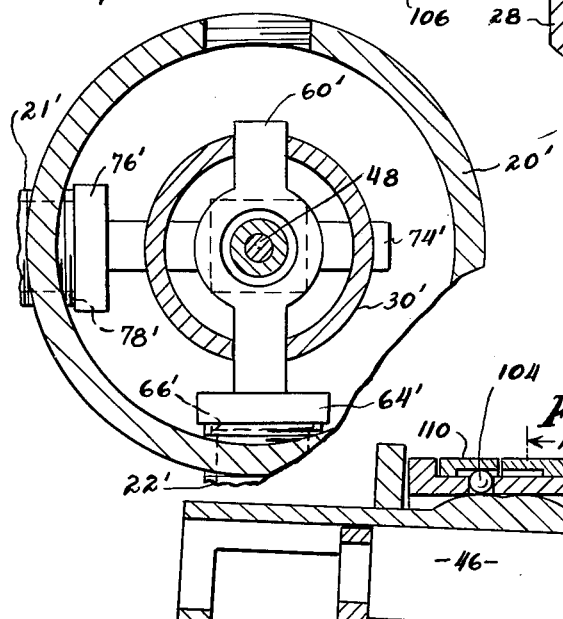
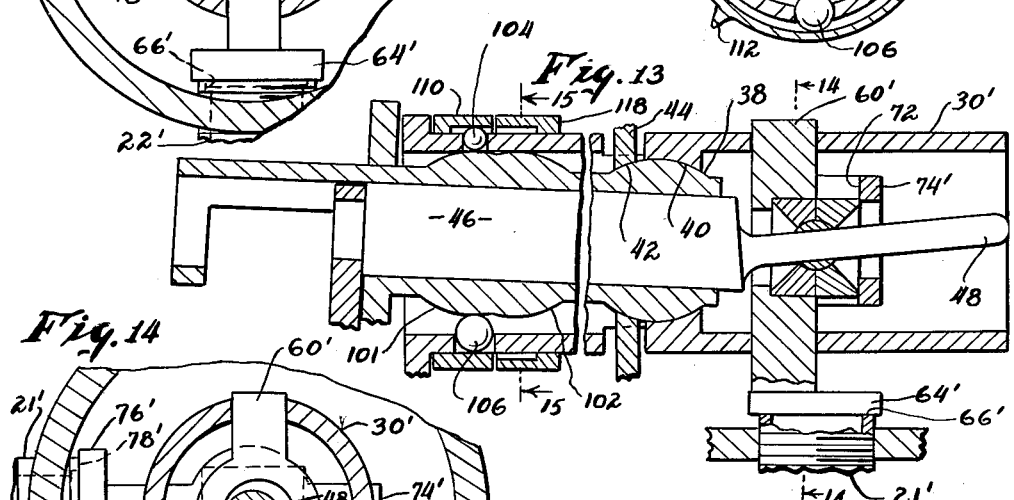
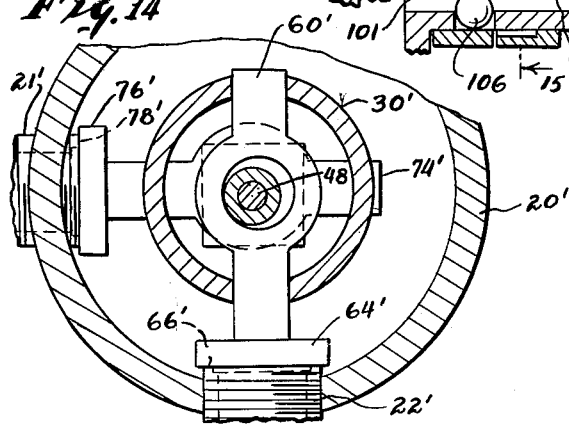
April 18, 1961 — O. HARKE — 2,980,130
MIXING VALVE
Filed Oct. 6, 1958 — 3 Sheets-Sheet 3
Fig. 10
Fig. 11
Fig. 12
Fig. 13
Fig. 14
INVENTOR.
Otto Harke
BY Emery, Whittemore, Sandoe & Dix
ATTORNEYS 2,980,130
Patented Apr. 18, 1961

2,980,130

MIXING VALVE

Otto Harke, 50—26 64th St., Woodside, N.Y.

Filed Oct. 6, 1958, Ser. No. 765,385

15 Claims. (Cl. 137—315)

This invention relates to mixing valves and more especially to valves which are used to supply selected mixtures of hot and cold water to a showerhead or faucet.

It is an object of the invention to provide an improved mixing valve which can be adjusted to determine the ratio of hot to cold water, and which can be moved to change the amount of water supplied without changing the ratio. Another object of the invention is to provide an improved mixing valve which utilizes an eccentric for determining the extent to which different valve elements are opened in response to the operation of a common actuator.

Features of the invention relate to the handle construction for operating a valve of the character indicated and to means for adjusting the pressure with which the valve elements are held closed when the water supply is shut off.

The invention will be described as applied to a mixing valve for hot and cold water, but it will be understood that it can be applied to mixing valves for handling other fluids.

Other objects, features and advantages of the invention will appear or be pointed out as the description proceeds.

In the drawing, forming a part hereof, in which like reference characters indicate corresponding parts in all the views:

Figure 1 is a side elevation of a mixing valve made in accordance with this invention;

Figure 2 is a fragmentary, top plan view, on a reduced scale, of the handle portion of the construction shown in Figure 1;

Figure 3 is a front view, on a reduced scale, of the handle construction shown in Figure 1;

Figure 4 is a sectional view through the mixing valve shown in Figure 1;

Figure 5 is an enlarged sectional view taken on the line 5—5 of Figure 4;

Figures 6 and 7 are sectional views taken on the lines 6—6 and 7—7, respectively, of Figure 5;

Figures 8 and 9 are sectional views, similar to Figure 5, but showing the valve adjusted to move the valve elements by different displacement ratios as a result of a change in the angle of maximum eccentricity;

Figure 10 is a greatly enlarged sectional view through a slightly modified construction of the invention for illustrating more simply the adjustment of the closing pressure of the valve elements;

Figures 11 and 12 are sectional views on the lines 11—11 and 12—12, respectively of Figure 10;

Figure 13 is a sectional view, similar to Figure 10, but showing the closing pressure adjusting means in a different position; and Figures 14 and 15 are sectional views taken on the lines 14—14 and 15—15, respectively, of Figure 13, but showing the adjustable parts in different positions.

The valve shown in Figure 1 includes a housing 20 to which hot water and cold water are supplied through pipes 21 and 22, respectively, connected to the housing 20 in any suitable manner. The mixed water from the housing 20 passes to a showerhead or faucet through a delivery pipe 24. It will be evident that the pipes 21, 22 and 24 can be located at any desired angular positions around the housing 20, but with the operating mechanism illustrated herein, the pipes 21 and 22 are preferably located at an angular spacing of 90° from one another around the circumference of the housing 20.

The mixing valve is supported on a bulkhead or wall 26 and there is a nut 28 for clamping the housing 20 to the wall 26 permanently to secure the mixing valve in place. The invention can be made for use with walls of any thickness by changing the length of the threaded portion of the housing 20 over which the nut 28 is threaded. The nut 28 also holds the valve parts in assembled relation with the housing 20. By removing the nut 28, the entire valve assembly can be removed intact from the housing 20, and a new valve assembly can be inserted as necessary.

There is a sleeve 30 (Figure 4) within the housing 20 and extending from the front of the housing beyond the nut 28.

In order to protect the sleeve 30 and the working parts of the valve from corrosion by water, the construction shown in Figure 4 has a tube or boot 31 over it. This tube or boot 31 is made of rubber or other waterproof and stretchable material which yields to permit movement of the valve elements. This sleeve is held in a fixed relation with the housing 20 by a back wall 32 of the housing 20 and by the nut 28 at the front of the housing. In the preferred construction, the tube or boot 31 is closed at one end and covers the portion of the sleeve 30 that extends into the recess in the back wall 32. At its forward end the boot 21 has a flange 33 clamped between washers 34, one of which is in contact with a shoulder 35 in the housing 20.

A hollow shaft 36 extends into the sleeve 30 and is provided with a bearing surface 38, best shown in Figure 10, and this bearing surface 38 constitutes a zone of a sphere. Although Figure 10 shows a construction that differs in some ways from that of Figure 4, the construction for supporting the hollow shaft in the sleeve is the same. Corresponding parts in Figure 10, which differ from Figure 4 are indicated by the same reference characters with a prime appended. The bearing surface 38 fits within a complementary zone bearing 40 formed in the sleeve 30'; and within another zone bearing 42 formed on a disc 44 which is held in place by the nut 28. In the construction shown in Figure 4, the disc 44 holds the washers 34 clamped against the boot flange 33.

The maximum diameter of the bearing surface 38, along the axis of the hollow shaft 36, is located between the bearings 40 and 42 so that these bearings prevent axial displacement of the hollow shaft 36 in addition to preventing radial displacement. The hollow shaft 36 is rotatable about its longitudinal axis and is also angularly movable about the center of the bearing 38, which center is located on the longitudinal axis of the hollow shaft.

Referring again to Figure 10, an inner shaft 46 rotates in the hollow shaft 36' and is also axially movable in the hollow shaft 36'. An eccentric stud 48 extends from one end of the inner shaft 46. This eccentric stud is connected with the shaft 46 at one side of the center axis of the shaft 46 and the stud 48 extends across and to the other side of the longitudinal axis of the shaft 46 so that there is one point where the axis of the shaft 46 and stud 48 intersect one another. This point of intersection where axes of shaft 46 and stud 48 normally intersect is indicated by the reference character 50; and it will be referred to herein as the "neutral point." At times the neutral point 50 is shifted somewhat from the axis of the shaft 46 to compensate manufacturing tolerances and differences in wear of the valve elements or seats, as will be explained later in connection with Figures 10–15.

There is a universal bearing 52 (Figure 6) with a cylindrical inner surface within which the stud 48 slides. The universal bearing 52 has a spherical outer surface with the center of the spherical surface on the longitudinal axis of the stud 48. This universal bearing 52 is held between two blocks 54 and 56 which have spherical bearing surfaces in contact with the outer surface of the universal bearing 52.

There are passages through the blocks 54 and 56 to provide clearance for the stud 48. The minimum diameter of these passages is substantially greater than the diameter of the stud 48 in order to permit a substantial angle of universal movement of the blocks 54 and 56 on the universal bearing 52.

The block 54 is held in a valve stem 60. This valve stem extends through the wall of the sleeve 30 on opposite sides of the sleeve; and the openings through the wall provide bearing surfaces in which the valve stem 60 is slidable in the direction of its length. A valve element 64, attached to the outer end of the valve stem 60, moves toward and from a seat 66 at the end of a passage 68 through which water flows from the pipe 21. The block 54 is held in a channel 70 in the valve stem 60, but the channel 70 extends normal to the plane of section of Figure 6.

The block 56 is similarly held in a channel 72 in a valve stem 74 which slides in bearings formed by openings through the sleeve 30; and there is a valve element 76 attached to the outer end of the valve stem 74 and movable toward and from a valve seat 78 at a passage 80 to which water is supplied from the pipe 22.

Since the blocks 54 and 56 are carried by the slots 70 and 72, which are at right angles to one another, it will be apparent that the blocks 54 and 56 move as a unit with either of the valve stems 60 or 74 as the valve stem moves its valve element toward or from its valve seat; and that when one of the valve stems is moving, the block 54 or 56, in the slot of the other valve stem, moves lengthwise of that slot. It is, of course, possible for the blocks to have compound movement with the valve stems and lengthwise along both slots when both valve stems are moving simultaneously; but it should be understood that the blocks 54 and 56 always move as a unit with each other because they fit over the common universal bearing 52.

Rotation of the inner shaft 46 and the eccentric stud 48 about the axis of the inner shaft 46, effects no movement of the blocks 54 or 56 when the neutral point 50 is located at the center of the universal bearing 52. The valve stems 60 and 74 are constructed of such length that the valve elements 64 and 76 are in their closed positions when the neutral point 50 is at the center of curvature of the spherical surface of the universal bearing 52.

Whenever the inner shaft 46 is moved axially, the stud 48 moves axially through the universal bearing 52 and this shifts the universal bearing 52 and the blocks 54 and 56 radially with respect to the axis of the inner shaft 46. Such movement of the blocks 54 and 56 causes either or both of the valve stems 60 and 74 to move their valve elements 64 and 76 away from the valve seats with which these valve elements contact.

Whether or not the stud 48 moves one or both of the valve elements 64 and 76 depends upon the direction in which the stud 48 slopes; and this direction is changed by rotation of the inner shaft 46 by which the stud 48 is carried. The axis of rotation of the shaft 46 is indicated by the reference character 84 in Figures 5, 8 and 9. In Figure 3 the axis of the stud 48 is shown sloping upwardly with its co-ordinate of eccentricity at an angle of 135° (Cartesian co-ordinates). This causes the valve element 76 to be open, but the valve 64 remains closed because the axis of the stud 48 is not displaced with respect to the valve seat 66.

In Figure 8, the stud 48 has been turned clockwise for 45° from its position of Figure 5, and the component of eccentricity in Figure 8 is at the 90° position, and the axis of the stud 48 is displaced with respect to both of the valve seats with the result that the valve elements 64 and 76 are both open.

Figure 9 shows the stud 48 turned into a position 90° clockwise with respect to Figure 5 and 45° clockwise with respect to Figure 8. In this position, the 45° angular position, the valve element 64 is open; but the valve element 76 remains closed because the axis of the stud 48 is no further from the valve seat 78 than is the axis 84 of the inner shaft 46.

From the operation of the valve elements 64 and 76, as described in connection with Figures 5, 8 and 9, it will be apparent that longitudinal movement of the stud 48, with resulting increase in eccentricity, has the effect of opening the valve elements 64 and 76 to greater displacements from their valve seats but without changing the ratio of their respective displacements from their valve seats.

Referring again to Figure 4, the inner shaft 46 has a crank arm 86 extending through a slot 87 in the hollow shaft 36, and this crank arm 86 is connected to a handle 88 which is preferably made of plastic. The handle 88 slides axially along the hollow shaft 36, and the inner shaft 46 and crank arm 86 move as a unit with the handle 88. The slot 87 in the hollow shaft 36 is long enough to provide the maximum desired axial movement for the inner shaft 46 and its associated eccentric stud 48; and the slot 87 is wide enough to provide 90° of angular movement for the handle 88, crank arm 86, inner shaft 46 and eccentric stud 48. Positions of the handle 88 at opposite ends of this angular movement are indicated in dotted lines in Figure 3.

There is a knob 92 (Figures 1 and 2) secured to the outer end of the hollow shaft 36, by a threaded hub 93. In order to facilitate manual operation of the handle 88, another knob 94 is connected to the handle by fastening means, including a tongue 95 and screw 96. The screw 96 prevents axial movement of the knob 94 and tongue 95 with respect to the handle 88, and the tongue 95 engages over a boss 97 on the handle to prevent angular movement of the knob and tongue with respect to the handle 88. At the level of the hollow shaft 36, the tongue has a wide section 99 with clearance behind both sides of the tongue for receiving the operator's fingers.

Throughout a portion of its length, the hollow shaft 36 has a bushing 98 which fits snugly within the hollow shaft 36 and around the inner shaft 46 along part of the length of this inner shaft 46. The slot 87 extends through the bushing 98. At the inner end (that is, the right hand end in Figure 4) where the inside diameter of the hollow shaft is increased to accommodate the bushing 98, there is a packing ring 100.

This packing ring 100 surrounds the inner shaft 46 and is compressed between the end of the bushing 98 and the shoulder of the hollow shaft 36 formed by the change in diameter of the inside surface of the hollow shaft. This axial compression of the packing 100 expands it against the surface of the inner shaft 46 and the confronting face of the hollow shaft 36. The packing 100 can be compressed more tightly, as necessary, to prevent any leakage of water along the shaft 46 when the construction is one where water could otherwise leak along this shaft 46.

Another important function of the packing 100 is to provide friction for resisting longitudinal movement of the inner shaft 46. This friction holds the shaft 46 in any selected position. Although this friction also resists angular movement of the shaft 46, to some extent, other friction means further from the center of rotation are preferably provided for resisting angular movement of the shaft 46, as will be described.

In order to move the hollow shaft 36 axially to vary the pressure on the packing 100, a screw 100ª is provided within the knob 92. This screw 100ª threads into the hub 93 and has an end face that bears against the end of the bushing 98.

In the operation of the device, the handle 88 is pulled outwardly, as indicated in dotted lines in Figure 1, in order to move the valve elements into wider open positions to increase the flow of water, and the handle 88 is pushed inwardly, to the full-line position shown in Figure 1, to move the valve elements back into closed positions and to shut off the water. The upper end of the handle 88 is preferably generally triangular in a transverse plane so that it serves as a pointer to indicate its angular position and the corresponding angular position of the eccentric stud which determines the ratio of hot to cold water. Indications on the wall 26, behind the handle 88, can be used to show the direction of angular movement required to obtain more hot or cold water in the mixture.

When the handle 88 is to be pulled outwardly, this is most conveniently done by placing the fingers of one hand behind the wide section of the tongue 95 and pulling against the tongue while pressing against the knob 92 with the palm of the same hand. When the handle 88 is to be pushed inwardly, this is conveniently done by pushing the lower part of the hand against the knob 94; and this can be done while the palm of the hand is against the knob 92. Thus an accurate positioning of the handle 88, in the direction of its axial movement, is obtained to get exactly the desired ratio of hot water to cold water.

Because of manufacturing tolerances and wear of washers and valve seats, it is desirable to have some adjustments for the valve elements when they are in their closed positions. Such adjustments make it possible to increase the pressure of either or both of the valve elements against their seats if the showerhead or faucet drips because of some leakage past the valve elements.

In the preferred construction of the invention, the adjustment is obtained by moving the hollow shaft 36′ angularly in the bearings 40 and 42. This will be described in connection with Figures 10–15 which use the same construction for this adjustment as in Figure 4 where the scale is much smaller.

This angular movement rocks the axis of the hollow shaft 36 about the center of curvature of the bearing surfaces 38, 40 and 42 so that the neutral point 50 of the eccentric stud 48 moves toward either or both of the valve seats 66′ or 78′ (Figure 11) depending upon the angular position of the eccentric stud 48.

For the purpose of rocking the hollow shaft 36′ about the center of the spherical bearing 38, two spherical zone bearing surfaces 101 and 102 are provided on the outside surface of the hollow shaft 36′ some distance ahead of the spherical bearing 38.

There is an opening through the top of the sleeve 30′ for receiving a ball 104. A somewhat larger opening in the bottom of the sleeve 30′ contains a ball 106 larger than the ball 104. Both of the balls 104 and 106 touch the spherical zone surface 101, and the balls are held against the surface 101 by a cam ring 110; best shown in Figure 10.

The cam ring 110 has its maximum radial thickness over the ball 104, and the ring decreases progressively in thickness to a minimum under the ball 106 when the ring is in its neutral position. The differences in the radial thickness of the ring 110 compensate the difference in diameter of the balls 104 and 106.

In order to shift the hollow shaft 36′ downwardly in Figure 10, the cam ring 110 is rotated either clockwise or counter-clockwise from the neutral position. Such rotation pushes the ball 106 and hollow shaft 36 upwardly and provides clearance for the ball 104 to be moved upwardly by the hollow shaft 36′. There is a lug 112 on the cam ring 110 for rotating the cam ring conveniently whenever adjustment is necessary.

This upward movement of the hollow shaft 36′ at the surface 101 causes a downward movement of the end of the shaft 36′ on the other side of the center of the spherical bearing 38 (Figure 13) and a resulting downward movement of the eccentric stud 48 to thrust the valve element 64′ more firmly against the seat 66′.

There are openings through opposite sides of the sleeve 30′ for holding other balls 114 and 116 (Figure 15) corresponding to the balls 104 and 106, but at angular positions ninety degrees further around the periphery of the sleeve 30′ and at axail locations for contact with the bearing surface 102. A cam ring 118 surrounds the sleeve 30 outside of the balls 114 and 116 and this cam ring 118 is rotated to move the balls 114 and 116 radially with resulting displacement of the hollow shaft 36′ in a direction at right angles to the displacement produced by the first cam ring 110. This displacement by the cam ring 118 is used to move the other valve element 76′ (Figure 14) into firmer contact with its seat 78′.

The sectional views in Figures 10–15 show one valve element at the bottom of the chamber 28 and the other at one side of the chamber. This orientation makes comparison of the longitudinal and transverse sections clearer and is, therefore, believed to better illustrate the invention. It will be understood that terms of orientation are relative and that the operation of the adjustments in the constructions of Figures 1–7 are the same with the positions of the valve elements and associated parts shifted angularly through 45°.

In the illustrated construction means are provided for preventing the handle 88 (Figure 4) from moving too easily as it is swung angularly into different positions to change the ratio of hot to cold water. This means supplies friction and is, in effect, a brake. A plate 120 is secured to the crank arm 86 and to the back of the handle 88, and moves as a unit with the handle 88. There is an arcuate groove 122 in the plate 120 with the center of curvature of the arc at the axis of rotation of the handle 88.

Within the back of the handle 88, and of greater width than the slot 122, there is an arcuate groove 124 having its center of curvature also at the axis of rotation of the handle 88. A stud 126 extends through the slot 122 and into the groove 124. A thimble 128 around the stud 126 has a flange 129 at its outer end in contact with the back of the plate 120 both above and below the slot 122.

A unit 130 threads over the inner end of the thimble 128 and clamps a contact washer 132 against the front of the plate 120. A resilient washer 134 between the nut 130 and the contact washer 132 provides a yielding pressure of the flange 129 and washer 132 against opposite sides of the plate 120 to provide a friction brake for holding the handle 88 in any adjusted position. The nut 130 is adjustable to vary the friction of the brake.

The stud 126 slides freely in the thimble 128 to permit the handle 88 to move axially. The stud 126 is stationary at all times since it extends through a fixed arm 136 secured to the sleeve 30. The stud 126 is carried by another arm 138 secured to the hollow shaft 36; and this arm prevents rotation of the hollow shaft 36 since the stud 126 is held against swinging movement by the fixed arm 136.

In the construction shown in Figure 4 with the waterproof boot 31, the stems of the valve elements are within the boot; and the only exposed part of each valve element is the washer and the holder by which the washer is held. The drawing shows a washer 142 secured in a holder 144 by a screw 146 threaded through the boot and into the valve stem within the boot. The holder 144 is preferably bonded to the boot by fusing the boot but adhesive bonding can be used if desired.

The preferred embodiments of the invention have been illustrated and described, but changes and modifications can be made, and some features can be used in different combinations, without departing from the invention as defined in the claims.

What is claimed is:

1. A mixing valve having two different valve elements for controllnig the entrance of liquid from inlet passages into a mixing chamber, the inlet passages being at different angular positions around an axis passing through the mixing chamber with the axis of each of said inlet passages lying in a plane transverse to the said axis passing through the mixing chamber and disposed substantially radially thereof, guides in which the valve elements are confined to reciprocating movement toward and from their respective inlet passages, a common actuator connected to both valve elements for moving them in said guides, the actuator having free sliding movement with respect to each valve element in the direction of movement of the other valve element, a reciprocating operating element connected to the actuator and movable substantially along the aforesaid axis passing through the mixing chamber and extending through the actuator and having a sloping surface that displaces the actuator as the operating element is moved back and forth in the actuator to vary the actuator displacement, and means for turning the operating element about an axis to bring the sloping surface into different angular positions around the mixing chamber to change the direction of displacement of the actuator with respect to the directions of movement of the different valve elements.

2. A mixing valve according to claim 1 and in which the operating element is a stud, and the means for turning the operating element is a shaft rotatable about its longitudinal axis, and the stud is connected to one end of the shaft and extends at a small acute angle to the longitudinal axis of the shaft and at one point along the length of the stud its longitudinal axis crosses an elongation of the axis of rotation of the shaft.

3. A mixing valve according to claim 2, and in which the stud slides through a bearing in the actuator, which bearing has universal oscillating movement with respect to the remainder of the actuator.

4. A mixing valve according to claim 2, and in which the actuator comprises a block having a recess therein with a spherical bearing surface, and a ball element that is held by the spherical bearing surface and that has universal oscillating movement therein, the ball element having an opening therethrough in which the stud slides.

5. A mixing valve according to claim 2, and in which there is a support for the shaft and the support has means for selectively shifting the axis of the shaft transversely toward and from either or both of the valve elements to regulate their closed positions.

6. A mixing valve according to claim 2, and in which there is a sleeve with an inside bearing surface in which the shaft has axial sliding movement, a support in fixed relation to the mixing chamber, and means for shifting the sleeve transversely in the support toward and from the passages into the mixing chamber.

7. A mixing valve according to claim 6, and in which the means for shifting the sleeve include separate adjustable parts operable independently to move the support toward and from the different passages and operable simultaneously to impart to the support components of movement toward or from both of said passages into the mixing chamber.

8. A mixing valve according to claim 6, and in which the adjustable parts include cams surrounding the support and having cam faces on the inside thereof and confronting the outside of the support, and elements located in openings through the support and by which movement of the cam faces shift the positions of the sleeve within the support.

9. A mixing valve according to claim 8, and in which the sleeve is mounted in the support in a ball-and-socket bearing located between the stud and the means for shifting the sleeve, and on which bearing the sleeve is oscillated in response to operation of the cams.

10. The mixing valve described in claim 1, and in which there is a handle operably connected to the reciprocating operating element and to the means for turning the operating element, the handle having both axial and angular movement, and a brake connected with the handle and resisting the movement of the handle in at least one direction.

11. A mixing valve according to claim 1, and in which all of the parts except the inlet passages and mixing chamber are a unitary assembly, and there are detachable fastening means securing the unitary assembly to the chamber having the passages therein.

12. A mixing valve according to claim 11, and in which the assembly is removable from the mixing chamber at the front thereof, and the fastening means includes a nut that threads over the front portion of the mixing chamber.

13. A mixing valve according to claim 1, and in which the reciprocating element has a surface behind which an operator's fingers can engage to pull the reciprocating element in one direction, and there is a stationary part of the assembly in position to rest the palm of the hand against when pulling the reciprocating element with the fingers of that hand.

14. In a mixing valve according to claim 1, and in which the means for turning the operating element includes a handle outside of the chamber and motion-transmitting connections extending from the handle to the operating element, and a waterproof and resilient boot in the chamber and enclosing said actuator and operating element and through which the actuator is connected with said valve elements.

15. In a mixing valve described in claim 14, a construction in which the operating element terminates short of the end of the chamber and the boot is closed at said end of the chamber and extends across that end of the operating element, the other end of the boot being open for passage of the connections of the handle to the operating element, a flange extending from the open end of the boot, and clamping means at the corresponding end of the chamber securing the flange of the boot to the end of the chamber nearest to the handle.

References Cited in the file of this patent

UNITED STATES PATENTS

| | | |
|---|---|---|
| 1,573,210 | Whidden | Feb. 16, 1926 |
| 2,616,710 | Woodruff | Nov. 4, 1952 |
| 2,758,610 | Hively | Aug. 14, 1956 |
| 2,839,084 | Wolf | June 17, 1958 |

FOREIGN PATENTS

| | | |
|---|---|---|
| 632,878 | Great Britain | Dec. 5, 1949 |
| 772,209 | Great Britain | Apr. 10, 1957 |